United States Patent [19]

Fegan

[11] 4,054,105
[45] Oct. 18, 1977

[54] MOTOR VEHICLE METRIC CONVERSION KIT

[76] Inventor: Francis Fegan, 630 St. Andrews St., W., Fergus, Ontario, Canada

[21] Appl. No.: 732,173

[22] Filed: Oct. 13, 1976

[51] Int. Cl.$^2$ ............................................. G01P 1/08
[52] U.S. Cl. ................................ 116/129 T; 116/116; 116/DIG. 47
[58] Field of Search ............... 116/129 R, 129 E, 116, 116/DIG. 47, 129 A, 129 K, 129 T; 156/108

[56] References Cited

U.S. PATENT DOCUMENTS

| | | | |
|---|---|---|---|
| 2,861,368 | 11/1958 | Rosenberg | 156/108 X |
| 3,276,418 | 10/1966 | Harris | 116/DIG. 47 X |
| 3,411,978 | 11/1968 | Frohbach et al. | 156/108 |
| 3,716,015 | 2/1973 | Godfrey | 116/DIG. 47 X |
| 3,980,041 | 9/1976 | Evans | 116/116 |

Primary Examiner—Daniel M. Yasich
Attorney, Agent, or Firm—Leonard W. Suroff

[57] ABSTRACT

A kit for permitting the direct reading from a standard speedometer having a front transparent panel and markings associated therewith in miles per hour to kilometers per hour.

6 Claims, 3 Drawing Figures

MOTOR VEHICLE METRIC CONVERSION KIT

BACKGROUND OF THE INVENTION

The present invention relates to a kit for use with motor vehicles and particularly to indicate the vehicle speed in metric units of kilometers per hour.

With the continuous changing to the metric system, it has been found desirable to provide a kit that will facilitate modification of a standard speedometer to indicate to the driver of the vehicle the speed in kilometers per hour. The ability to accomplish this permits a driver to install such a kit on the vehicle prior to going to those countries that utilize the metric system as well as having the ability to train oneself to think in the metric system.

OBJECTS OF THE INVENTION

An object of the present invention is to provide a kit for permitting the direct reading from a standard speedometer calibrated in miles per hour into kilometers per hour.

Another object of the present invention is to provide a kit adapted to be readily attached to and removed from a standard speedometer having indicia means calibrated in kilometers per hour to be viewed by the driver of the vehicle.

Another object of the present invention is to provide a kit for attachment to a speedometer and having alignment means associated therewith to obtain the proper positioning of the markings on each corresponding scale.

Other objects and advantages of the present invention will become apparent as the disclosure proceeds.

SUMMARY OF THE INVENTION

A kit for permitting the direct reading from a standard speedometer having a front transparent panel and markings associated therewith in miles per hour to kilometers per hour. The kit includes an elongated base having a front surface and rear surface, with indicia means on one of the surfaces and including a plurality of spaced apart numerals and guide lines angularly disposed to substantially coincide with markings on the standard speedometer. Securing means is utilized for removably coupling the elongated base to the transparent panel and includes an adhesive on the front surface with a cover thereon which when removed permits the base to be positioned and secured in place to the front panel so as to align the zero numeral of the indicia means with the similar marking on the standard speedometer.

Alignment means is provided and removably connected to the base to aid in the proper positioning thereof relative to the transparent panel prior to utilization of the securing means to obtain the proper alignment of the indicia means with respect the speedometer markings.

The kit is further provided with gripping means outwardly extending from the base to facilitate handling and positioning thereof relative to the speedometer. The gripping means includes a pair of spaced apart tabs adapted to be gripped by the fingers of a person installing the kit.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
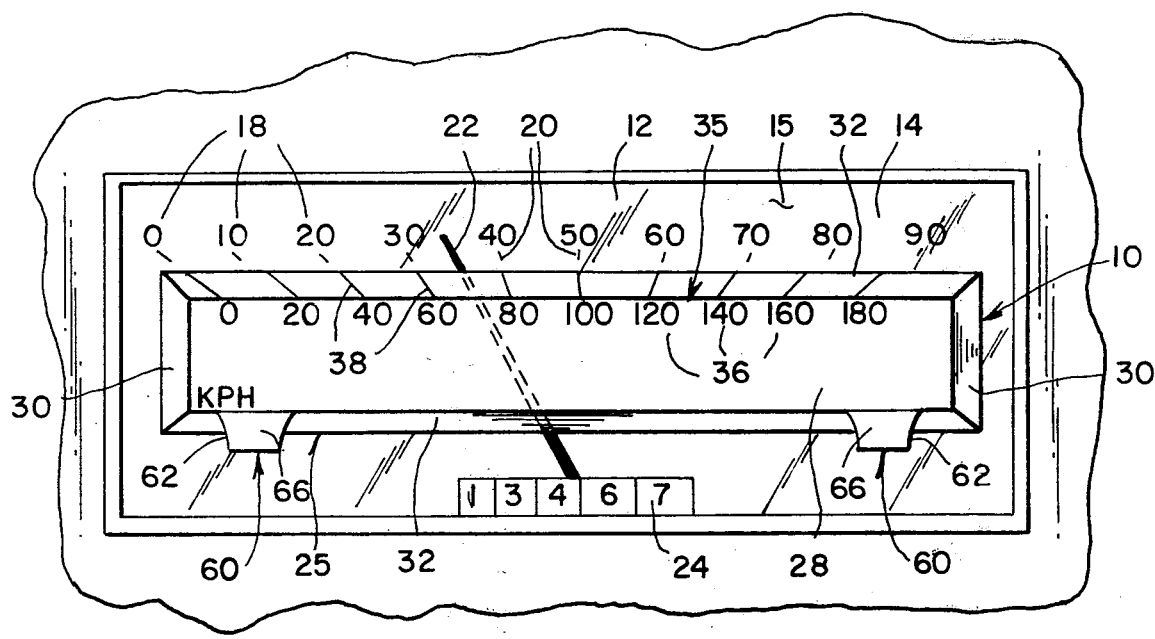
FIG. 1 is a front plan view of the kit in assembled relationship to a standard speedometer.
Figure 2:
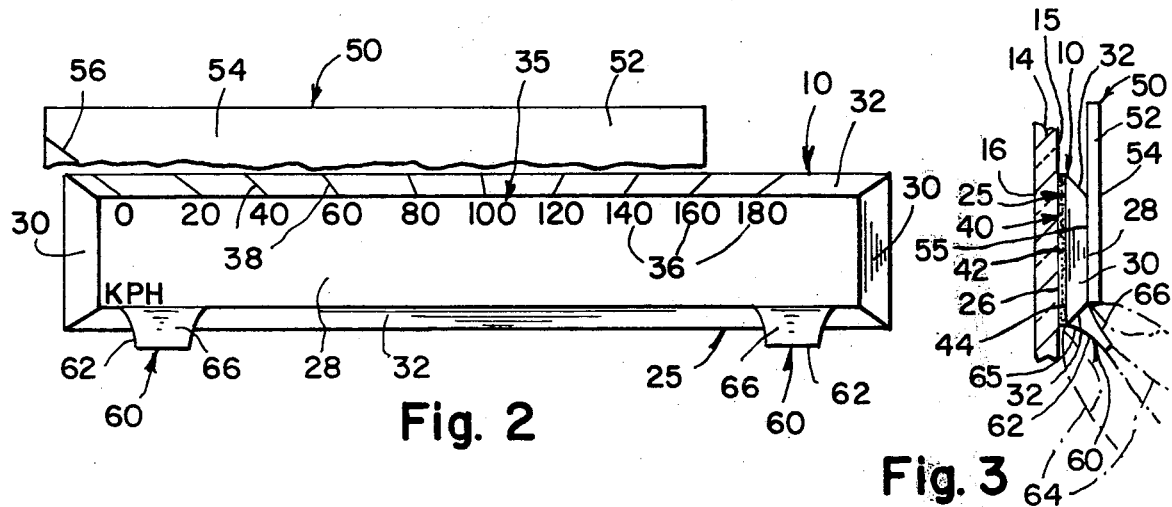
FIG. 2 is a front plane view of the kit prior to its securement to the speedometer.
Figure 3:
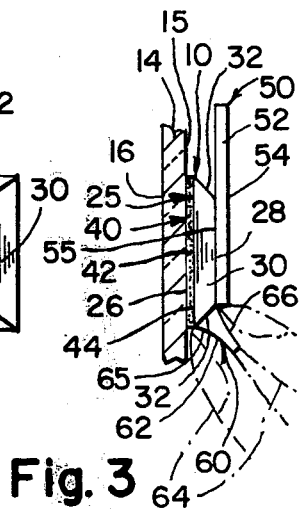
FIG. 3 is a side view illustrating the kit secured to the panel of the speedometer.

Referring to FIGS. 1-3, there is illustrated a kit 10 adapted to be secured in place to a standard speedometer 12 contained in a motor vehicle and having a front transparent panel 14 having an outer surface 15 and an inner surface 16. The speedometer 12 further includes a set of numeral markings 18 that may start with the numeral zero at one end thereof and graduate upward on a preselected scale. In addition to the numeral markings 18, the speedometer also includes line markings 20 generally associated with each numeral 18. The configuration of the standard speedometer 12 may be rectangular, circular, etc.

Under normal operating conditions the needle 22 would normally indicate the speed in miles per hour ("MPH"). The speedometer 12 may even contain an odometer 24 associated therewith. The kit 10 is designed to permit the driver to eventually think metric in order for him to determine the speed of the vehicle in kilometers per hour ("KPH").

The kit 10 includes an elongated base 25 that may be made from Lucite or other transparent material and having a front surface 26 and rear surface 28. The rear surface 28 includes a beveled side wall 30 and end walls 32. The elongated base 25 is of sufficient size as seen in FIG. 1 to extend across the width of the speedometer 12 and extend on one side of the numerals 18.

To provide for the driver the instant conversion from MPH to KPH, the base 25 is provided with indicia means 35 which may be contained on the front surface 26 or rear surface 28. The indicia means 35 includes a plurality of spaced apart numerals 36 and guide lines 38 angularly disposed to substantially coincide with markings 20 on the speedometer 12. The type of lettering, color, etc., for both the numerals 36 and guide lines 38 are selected to most vividly display to the driver the information in KPH.

Since the kit 10 is to be used on existing motor vehicles, to obtain the desired conversion, securing means 40 is provided for removably coupling the base 25 to the transparent panel 14. The securing means in order not to limit the vision of the driver may be in the form of an adhesive layer or coating 42 contained on the front surface 26 of the base 25. For storage prior to use, a cover 44 may be provided over the adhesive 42.

In this manner the cover 44 is peeled off from the adhesive 42 and the base 25 is available to be positioned and secured in place to the outer surface 15 of the transparent panel 14. As illustrated in FIG. 1, the zero numerals of the MPH and KPH scales should be in alignment with each other relative to the angle of the needle 22 when at rest. In addition, the markings 38 may also be in alignment with the markings 20. It is important to properly position the base 15 in the appropriate relationship in order to have the proper relationship between the two scales. The elongated base 25 is transparent and may also have printed thereon as part of the indicia means 35 the abbreviation KPH at one corner thereof.

In view of the importance of proper mounting of the base 25 relative to the speedometer 12, alignment means 50, as illustrated in FIG. 2 and 3, is provided. The alignment means 50 is removably connected to the rear surface 28 and is utilized as an aid in the proper positioning of the tranparent panel 14 and base 25 relative to each other. In this manner once the alignment is made, the securing means 40 is utilized to obtain the assembled relationship of FIG. 1.

The alignment means 50 includes a plate 52 having a back surface 54 and a front surface 55. Either surface 54 or 55 may include thereon an angularly disposed scale arm 56 printed thereon. The scale arm is utilized to initially align the zero numerals of the respective scales with each other. The plate 52 may be transparent not to hinder the viewing of the respective markings provided. The plate 52 may be adhesively secured such that it is readily removed after its purpose has been completed.

Considering the fact that it is desirable to assemble the base 25 to the panel 14 on the first try so as not to have to repeat this task with the possible marring of the surface 15 with the adhesive 42, gripping means 60 have been provided. The gripping means 60 extend outwardly from the base 25 to facilitate handling and positioning the base 25 relative to the speedometer 12. The gripping means may include a pair of spaced apart tabs or fingers 62 adapted to be gripped by the fingers 64 of a person installing the kit 10. Each tab is inclined and may extend from the bevel 32 and contoured with an inner face 65 directed towards the front surface 26 and an outer face 66. In this manner the person positioning base 25 in place may initially grip the tabs 62, one in each hand, and with the utilization of the alignment means 50 properly position the base 25 in place. Once this has been completed, the plate 52 may be removed leaving the base 25 as seen in FIG. 1.

The tabs 62 are provided such that a finger 64 may be positioned to engage the inner face 65 to apply a force for removing the base 25. It may be desirable to remove the base 25 when the kit 10 is no longer to be used or when the base 25 is inadvertently improperly positioned in the assembled relationship, as illustrated in FIG. 1. When this occurs the tabs may be gripped as illustrated in FIG. 3 to remove and reposition the base 25 in proper alignment. The fingers 64 permit the application of the force necessary for separation of the base 25 from the transparent panel 14.

In this manner a novel kit for use in motor vehicles for the purpose described has been illustrated. In this manner a kit is provided that not only provides the proper speed relationship between MPH and KPH but the necessary elements to permit an eaasy and accurate assembly, and disassembly if desired, in a kit.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A kit for permitting the direct reading from a standard speedometer having a front transparent panel and markings associated therewith in miles per hour to kilometer per hour, comprising:

a. an elongated base having a front surface and rear surface,
   b. indicia means on one of said surfaces and including a plurality of spaced apart numerals and guide lines angularly disposed to substantially coincide with markings on the standard speedometer,
   c. securing means for removably coupling said elongated base to the transparent panel, said securing means including an adhesive on said front surface with a cover thereon which when removed permits said elongated base to be positioned and secured in place to the front panel so as to align the zero numeral of said indicia means with the similar marking on the standard speedometer, and
   d. alignment means having at least one angularly disposed scale arm to align the numerals of said indicia means with the speedometer markings, said alignment means being removably connected to said elongated base to aid in the proper positioning thereof relative to the transparent panel prior to utilization of said securing means to obtain the proper alignment of said indicia means with respect to the speedometer markings.

2. A kit according to claim 1, wherein said elongated base is transparent.

3. A kit according to claim 1, wherein said indicia means further includes the abbreviation thereon of K.P.H.

4. A kit according to claim 1, wherein said alignment means includes a plate removably secured to said rear surface and having said angularly disposed scale arm in alignment with the zero numeral on said indicia means to assist in positioning said elongated base relative to the zero marking on the speedometer prior to utilization of said securing means.

5. A kit for permitting the direct reading from a standard speedometer having a front transparent panel and markings associated therewith in miles per hour to kilometers per hour, comprising:

a. an elongated base having a front surface and rear surface,
   b. indicia means on one of said surfaces and including a plurality of spaced apart numerals and guide lines angularly disposed to substantially coincide with markings on the standard speedometer,
   c. securing means for removably coupling said elongated base to the transparent panel, said securing means including an adhesive on said front surface with a cover thereon which when removed permits said elongated base to be positioned and secured in place to the front panel so as to align the zero numeral of said indicia means with the similar marking on the standard speedometer.
   d. gripping means outwardly extending from said elongated base to facilitate handling and positioning thereof relative to the speedometer,
   e. said gripping means includes a pair of spaced apart tabs adapted to be gripped by the fingers of a person installing the kit, said tabs are inclined having a contoured inner face directed towards said front surface to permit a finger to be positioned between the transparent panel and said tab so as to apply a force necessary for separation of said elongated base from the transparent panel, and
   f. alignment means having at least one angularly disposed scale arm to align the numerals of said indicia means with the speedometer markings, said alignment means being removably connected to said elongated base to aid in the proper positioning thereof relative to the transparent panel prior to utilization of said securing means to obtain the proper alignment of said indicia means with respect to the speedometer markings.

6. A kit according to claim 1, wherein said alignment means includes a plate removably secured to said rear surface and having said angularly disposed scale arm in alignment with the zero numeral on said indicia means to assist in positioning said elongated base relative to the zero marking on the speedometer prior to utilization of said securing means.

* * * * *